United States Patent [19]
Koma

[11] Patent Number: 6,097,466
[45] Date of Patent: Aug. 1, 2000

[54] REFLECTION TYPE LIQUID CRYSTAL DISPLAY

[75] Inventor: Norio Koma, Motosu-gun, Japan

[73] Assignee: Sanyo Electric Co., Ltd., Osaka, Japan

[21] Appl. No.: 09/193,493

[22] Filed: Nov. 17, 1998

[30] Foreign Application Priority Data

Nov. 18, 1997 [JP] Japan ..................................... 9-317519

[51] Int. Cl.$^7$ .......................... G02F 1/1343; C09K 19/30
[52] U.S. Cl. ............... 349/143; 252/299.63; 252/299.67; 349/42; 349/129
[58] Field of Search ..................... 252/299.63, 299.67; 349/143, 129, 42; 428/1.1

[56] References Cited

U.S. PATENT DOCUMENTS

| | | | |
|---|---|---|---|
| 5,471,330 | 11/1995 | Sarma et al. .............................. | 349/43 |
| 5,514,879 | 5/1996 | Yamazaki et al. ........................ | 257/65 |
| 5,557,534 | 9/1996 | Wu ........................................ | 395/500.2 |
| 5,576,860 | 11/1996 | Nakamura et al. ...................... | 349/113 |
| 5,600,155 | 2/1997 | Wu ............................................ | 257/22 |
| 5,905,548 | 5/1999 | Shimada ................................... | 349/38 |

*Primary Examiner*—Shean C. Wu
*Attorney, Agent, or Firm*—Hogan & Hartson, LLP

[57] ABSTRACT

A TFT using a low-temperature poly silicon thin film as an active layer is formed on a TFT substrate, and a plurality of pixel electrodes made of a reflection material such as Al are formed on the TFT and an electrode wiring through an interlayer insulator film to cover the TFT and the electrode wiring. A liquid crystal layer has a vertical alignment, and a fluorine based liquid crystal molecule having a negative dielectric anisotropy and at least fluorine on a side chain is used as a liquid crystal material. A product Δn ·d of a birefringence Δn of the liquid crystal layer and a thickness d of the liquid crystal layer is set equal to or less than 0.30 so that an excellent voltage—transmittance characteristic can be obtained. Thus, the liquid crystal layer can be fully operated by low-voltage driving which is realized by a poly silicon TFT.

8 Claims, 4 Drawing Sheets

REFLECTION TYPE LIQUID CRYSTAL DISPLAY

BACKGROUND OF THE INVENTION

1. Field of the Invention

The present invention relates to an active-matrix type liquid crystal display (LCD) for respectively driving pixels by thin film transistors(TFT) to perform a liquid crystal display operation, and more particularly to a reflection type liquid crystal display utilizing poly silicon formed through low-temperature process.

2. Description of the Prior Art

A liquid crystal display which is provided with a liquid crystal sealed between a pair of substrates and applies a voltage to the liquid crystal to perform desirable display operation has an advantage that it is small-sized and thin and can easily reduce power consumption. For this reason, currently, the liquid crystal display has been used practically as a display for various OA and AV device, portable or on-board information device, or the like. In particular, a so-called active-matrix type liquid crystal display using a thin film transistor (hereinafter referred to as a TFT) as a switching element for driving each liquid crystal pixel can selectively drive the TFT to select a liquid crystal pixel. Therefore, image display having no cross talk and a higher resolution can be obtained.

As the TFT to be used for the liquid crystal display, there have been known an amorphous silicon TFT using amorphous silicon for an active layer and a poly silicon TFT using poly silicon having a higher mobility for the active layer. The amorphous silicon TFT has mostly been used for a large-sized display and the like because it can be formed over a large area in a low-temperature process. On the other hand, the poly silicon TFT has a higher mobility than the amorphous silicon and can form an element in a self-aligned manner. Therefore, the poly silicon TFT can easily reduce a TFT area and a pixel area more than the amorphous silicon TFT so that a display having a high resolution can be manufactured. With the use of the poly silicon, the TFT can easily have a CMOS structure. For this reason, a driver TFT for driving a display section TFT can be formed on the same substrate in almost the same processes as the display section TFT.

As stated above, the poly silicon TFT has such attractive characteristics and can have a driver on its substrate. The poly silicon is formed by polycrystallizing amorphous silicon in a high-temperature process. The amorphous silicon is exposed to a high temperature during the process. Therefore, an inexpensive glass substrate cannot be used for the substrate. For this reason, it is difficult to use the poly silicon TFT in a practical situation.

However, a polycrystallization technology using an annealing treatment such as laser annealing, lamp annealing or the like has been enhanced. Consequently, it has been possible to manufacture the poly silicon in the low-temperature (below 600° C.) process. In a method for forming the poly silicon TFT in the low-temperature process, thus, an inexpensive glass substrate can be used for a substrate. Therefore, cost can be reduced, and furthermore, an area can be increased. As a result, the poly silicon TFT (hereinafter referred to as a low-temperature poly silicon TFT) formed in the low-temperature process can be used practically.

As described above, the low-temperature poly silicon TFT has been used practically. However, optimum conditions for exhibiting the characteristics of the low-temperature poly silicon TFT to the utmost and for enhancing the characteristics still more with the use of a reflection type liquid crystal display for a projector or the like, for example, a liquid crystal material, an optimal panel structure and the like have not been developed. Accordingly, a material and a structure which have been used in a liquid crystal display for a conventional amorphous silicon TFT are utilized for other purposes. Consequently, the characteristics of the poly silicon TFT cannot be exhibited fully.

SUMMARY OF THE INVENTION

In order to solve the above-mentioned problems, it is an object of the present invention to provide a liquid crystal material and a panel structure which are optimum for a reflection type liquid crystal display using a poly silicon TFT.

In order to attain the above-mentioned object, the present invention has the following features.

A first aspect of the present invention is directed to a reflection type liquid crystal display comprising a plurality of pixel electrodes provided in a matrix on a first substrate and made of a light reflection material, a thin film transistor formed on the first substrate to be connected with the corresponding pixel electrodes and an electrode wiring thereof, and a liquid crystal layer held between the pixel electrodes provided on the first substrate and a common electrode on a second substrate opposed to the first substrate, the liquid crystal layer being driven for each pixel electrode to perform display operation, wherein the thin film transistor uses a poly silicon layer for an active layer (formed at a low temperature), an initial direction of each liquid crystal molecule of the liquid crystal layer held between the first and second substrates is controlled in an almost vertical direction with respect to the pixel electrode, and a product $\Delta n \cdot d$ of a birefringence $\Delta n$ of the liquid crystal layer and a thickness d of the liquid crystal layer is set equal to or less than 0.30. An Al reflection material can be used as the pixel electrode.

If $\Delta n \cdot d$ has a value of 0.30, an excellent voltage—transmittance characteristic of the liquid crystal layer can also be obtained in the reflection type liquid crystal display. With a low driving voltage realized by the poly silicon thin film transistor, the liquid crystal can be reliably driven.

At least one kind of liquid crystal molecule having fluorine on a side chain is suitably selected as a liquid crystal material. The liquid crystal molecule having fluorine on a side chain has a high polarity in a direction of the side chain, that is, a direction of a minor axis of the liquid crystal molecule. With a low driving voltage realized by the poly silicon thin film transistor, the liquid crystal molecule can fully be operated. Because the polarity is high in the direction of the minor axis, repulsion for the alignment film is increased so that the initial direction of the liquid crystal can easily be set in the vertical direction, for example.

In a second aspect of the present invention, an electrode-free portion for controlling the alignment of the liquid crystal is provided as an alignment control window in a predetermined corresponding region of the common electrode provided on the second substrate which is opposed to the pixel electrode, and a plurality of alignment regions having different tilt azimuths are formed in each pixel electrode region while changing the vertical alignment of the liquid crystal molecule. By the alignment control window, the alignment region of the liquid crystal molecule is stably divided. Consequently, a plurality of preferential viewing directions can be provided on the display so that a viewing angle is enlarged. For this reason, advantageously, the display can be utilized for a projector and the size of a display screen can be increased.

In a third aspect of the present invention, the first substrate has a flattened interlayer insulator film formed thereon to cover the thin film transistor and the electrode wiring thereof which are provided on the first substrate, and the pixel electrodes formed on the flattened interlayer insulator film to cover a region where at least the thin film transistor is formed.

In a fourth aspect of the present invention, a liquid crystal material to be used for the liquid crystal layer has a negative dielectric anisotropy, and the vertical alignment of the liquid crystal layer is controlled without a rubbing step by a vertical alignment film formed to cover the common electrode and the pixel electrodes, the alignment control window provided on the common electrode and a voltage applied to each of the pixel electrodes.

If a pixel electrode is formed on a thin film transistor or the like, an aperture ratio of one pixel is not restricted by the thin film transistor or the like. For this reason, the aperture ratio can be rapidly enhanced so that very bright reflection type liquid crystal display can be obtained. By forming the pixel electrode on the flattened interlayer insulator film, unevenness of the pixel electrode does not affect the vertical alignment of the liquid crystal molecule. By causing the pixel electrode to cover the region where the thin film transistor or the like is to be formed, furthermore, an electric field generated by the thin film transistor or the like can be prevented from leaking into the liquid crystal layer. By positioning the pixel electrode on an upper layer, a voltage can be efficiently applied by the liquid crystal layer.

By such a structure, furthermore, the initial direction of the liquid crystal layer can be set to a vertical alignment without the rubbing step. Therefore, even if a driver TFT is built in the same substrate as a low-temperature poly silicon TFT for liquid crystal driving, there is no possibility of the driver TFT formed in a peripheral region of the substrate being damaged by rubbing. Thus, the present invention is more suitable for a liquid crystal display using a poly silicon TFT which is of a built-in driver type.

If a liquid crystal molecule having fluorine on a side chain, for example, shown in the following Formulas (1) to (6) is blended as a liquid crystal material, the above-mentioned condition of $\Delta n \cdot d$ of 0.30 or less can easily be met. By low-voltage driving suitable for the poly silicon TFT, the liquid crystal layer can be fully driven. Accordingly, it is possible to provide a reflection type liquid crystal display having a high brightness, low power consumption and a high resolution.

DESCRIPTION OF THE PREFERRED EMBODIMENT

A preferred embodiment of the present invention will be described below with reference to the drawings.

Figure 1:
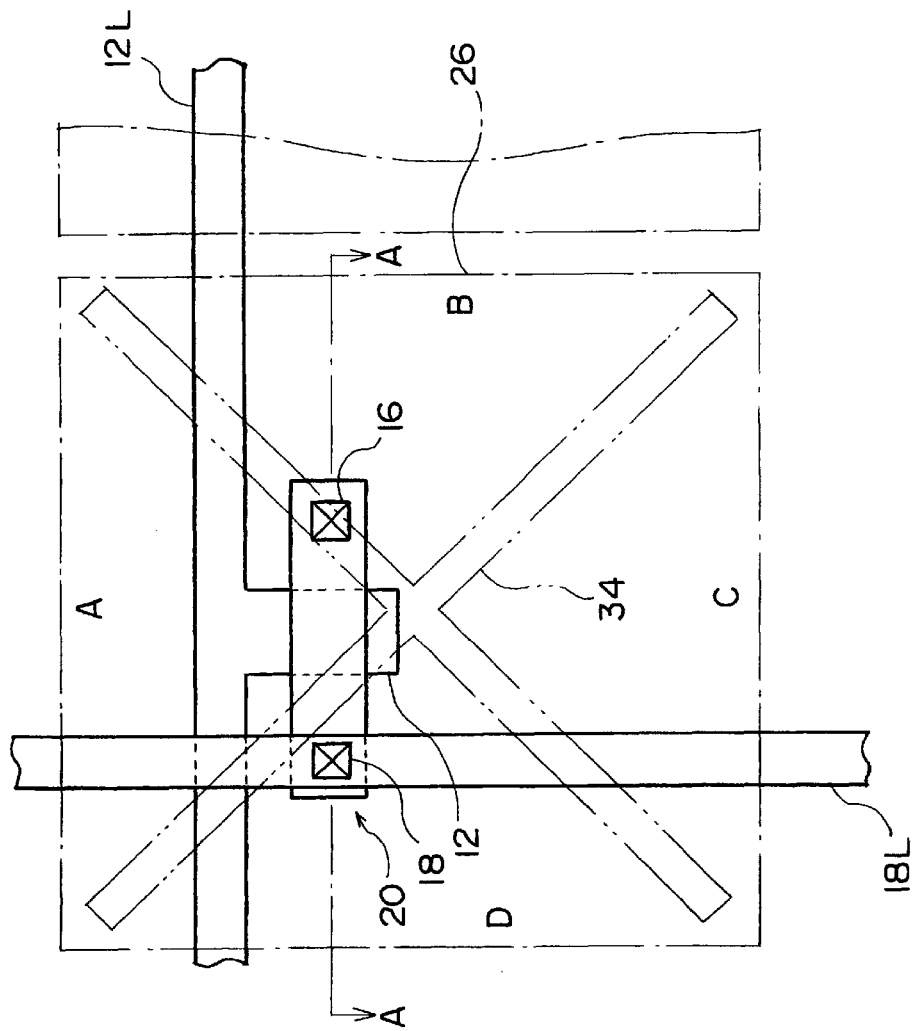
FIG. 1 is a conceptual view showing an example of a planar structure of a reflection type liquid crystal display according to an embodiment of the present invention.
Figure 2:
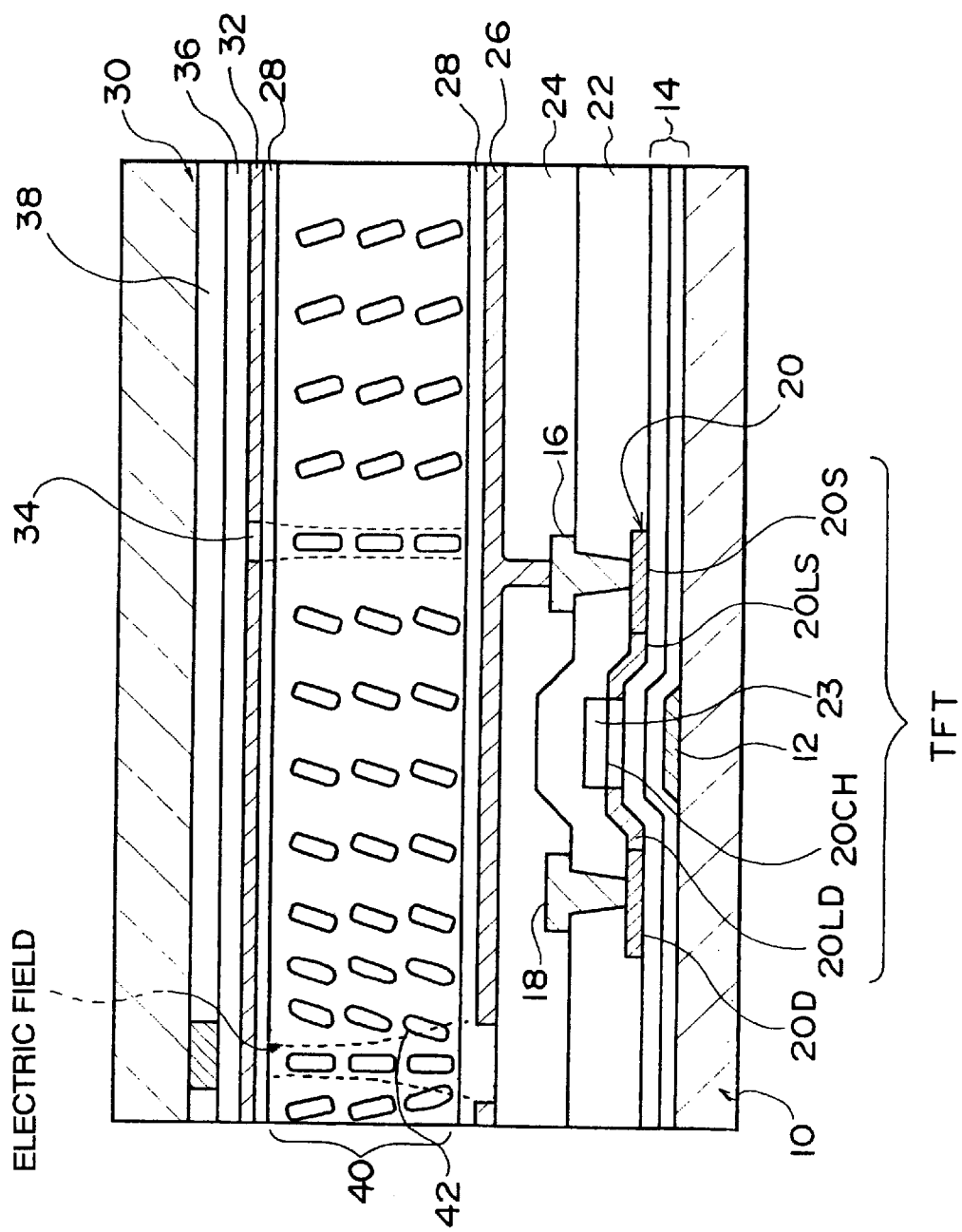
FIG. 2 is a view showing a schematic section taken along the line A—A in the liquid crystal display shown in FIG. 1.

FIG. 1 shows an example of a planar structure for one pixel of a reflection type liquid crystal display according to the embodiment of the present invention, and FIG. 2 shows an example of a schematic section taken along the line A—A in FIG. 1. The liquid crystal display according to the present embodiment is of a reflection type having a TFT substrate (a first substrate) 10 in which a low-temperature poly silicon TFT and a pixel electrode 26 using an Al reflection material provided on an upper layer above the TFT, and an opposed substrate (a second substrate) 30 on which a common electrode 32 having an alignment control window 34 is formed. A liquid crystal layer 40 interposed between the opposed substrate 30 and the TFT substrate 10. In the reflection type liquid crystal display according to the present embodiment, in order to a product (retardation) $\Delta n \cdot d$ of a birefringence $\Delta n$ of the liquid crystal layer 40 and a thickness d of the liquid crystal layer 40 satisfies equal to or less than 0.30, a liquid crystal material having a small birefringence $\Delta n$ is selected and the thickness d of the liquid crystal layer 40 is set to have a proper value. Consequently, low-voltage driving can be performed and a coloring phenomenon of LCD can be prevented. Thus, the reflection type liquid crystal display having an excellent voltage—transmittance characteristic can be implemented. [Structure of Reflection Type Liquid Crystal Display]

In the example shown in FIG. 2, a gate electrode 12 obtained by patterning metals such as Cr, Ta, Mo or the like and a gate electrode wiring 12L integrated with the gate electrode 12 are provided on the TFT substrate 10 made of glass or the like. A gate insulation film 14 having a lamination structure of SiNx and $SiO_2$ or either of them, for example, is formed to cover the gate electrode 12 and the gate electrode wiring 12L. A poly silicon thin film 20 functioning as an active layer of the TFT is formed on the gate insulation film 14. The poly silicon thin film 20 is formed as follows. An amorphous silicon thin film is poly-crystallized by a low-temperature (below 600 ° C.)annealing treatment using a combination of laser annealing and lamp annealing or either one of them, and is subjected to patterning like an island. Thus, the poly silicon thin film 20 is obtained.

A doping stopper 23 comprising SiO2 or the like is formed on the poly silicon thin film 20. The doping stopper 23 is formed by exposing a rear face of the TFT substrate 10 (the underside in FIG. 2) to light using the gate electrode 12 as a mask, thereby performing patterning to have almost the same shape as the gate electrode 12 in a self-aligned manner. By utilizing the doping stopper 23, the poly silicon thin film 20 is doped with impurities such as phosphorus, arsenic and the like in low concentrations. Consequently, a low concentration source region 20LS and a low concentration drain region 20LD which contain the impurities having low concentrations are formed in a self-aligned manner on both sides of the poly silicon thin film 20 in a region provided under the doping stopper 23, respectively. The doping stopper 23 serves as a mask so that the region provided under the doping stopper 23 is not doped with the impurities. Consequently, the region provided under the doping stopper 23 becomes an intrinsic region which contains substantially no impurities. The intrinsic region functions as a channel region 20CH of the TFT. A source region 20S and a drain region 20D are formed by doping the outsides of the low concentration source region 20LS and the low concentration drain region 20LD with the same impurities in higher concentrations.

An interlayer insulator film 22 comprising SiNx or the like is formed on the poly silicon thin film 20 having each region (20CH, 20LS, 20LD, 20S, 20D) formed thereon and the doping stopper 23 to cover them. A source electrode 16, a drain electrode 18 and a drain electrode wiring 18L integrated with the drain electrode 18, of Al, Mo or the like, are formed on the interlayer insulator film 22. The source electrode 16 and the drain electrode 18 are connected to the source region 20S and the drain region 20D which are formed on the poly silicon thin film 20 via a contact holes provided on the interlayer insulator film 22.

The low-temperature poly silicon TFT according to the present embodiment comprises the gate electrode 12, the gate insulation film 14, the poly silicon thin film 20 (20CH, 20LS, 20LD, 20S, 20D), the source electrode 16 and the drain electrode 18, and has, as an active layer, the poly silicon thin film 20 formed through a low-temperature process. The poly silicon TFT consists of a bottom gate type TFT in which the gate electrode 12 is positioned on the underside of an element. A shape of the TFT is not restricted to the bottom gate type but may be of a top gate type in which the gate electrode is provided on an upper layer above the poly silicon thin film.

In order to cover the TFT and the interlayer insulator film 22, a flattened interlayer insulator film 24 is further formed in a thickness of about 1μm or more over almost the whole surface of the TFT substrate 10. For example, SOG (Spin On Glass), BPSG (Boro - Phospho - Silicate Glass), acrylic resin or the like is used for the flattened interlayer insulator film 24. The pixel electrode 26 using an Al reflection material or the like is formed on the flattened interlayer insulator film 24 to cover a region where the TFT are formed. The pixel electrode 26 is connected to the source electrode 16 through a contact hole provided on the flattened interlayer insulator film 24. In order to cover the pixel electrode 26, a vertical alignment film 28 made of polyimide (SiNX) or the like, for example, is formed as an alignment film for aligning liquid crystal molecules in a vertical direction without a rubbing step over almost the whole surface of the TFT substrate 10.

The opposed substrate (second substrate) 30 is opposed to the TFT substrate 10 having the above-mentioned structure with the liquid crystal layer 40 interposed therebetween. The opposed substrate 30 is formed of glass or the like in the same manner as the TFT substrate 10. A RGB color filter 38 is formed on a surface on the opposite side to the TFT substrate 10. A common electrode 32 comprising ITO or the like for driving a liquid crystal together with the opposed pixel electrode 26 is formed on the RGB color filter 38 through a protective film 36 such as acrylic resin. In the present embodiment, an X-shaped electrode-free portion shown in FIG. 1, for example, is formed as the alignment control window 34 on an opposite region to each pixel electrode 26 in the common electrode 32. The same vertical alignment film 28 as on the TFT substrate 10 side is formed on the common electrode 32 and the alignment control window 34 to cover them.

The liquid crystal layer 40 is sealed in a gap between the substrates which is set to about 3μm, for example. A liquid crystal material to be used has a so-called negative dielectric constant anisotropy in which a dielectric constant in a direction of a minor axis of the liquid crystal molecule 42 is greater than that in a direction of a major axis thereof. The liquid crystal material is fabricated by mixing, at a desired rate, liquid crystal molecules indicated by the following Formulas (1) to (6). Mixing is performed to contain at least one kind of liquid crystal molecule in the formulas (1) to (6) having a fluorine side chain. For the reflection type liquid crystal display, a birefringence Δn is set to about 0.07 or less, for example.

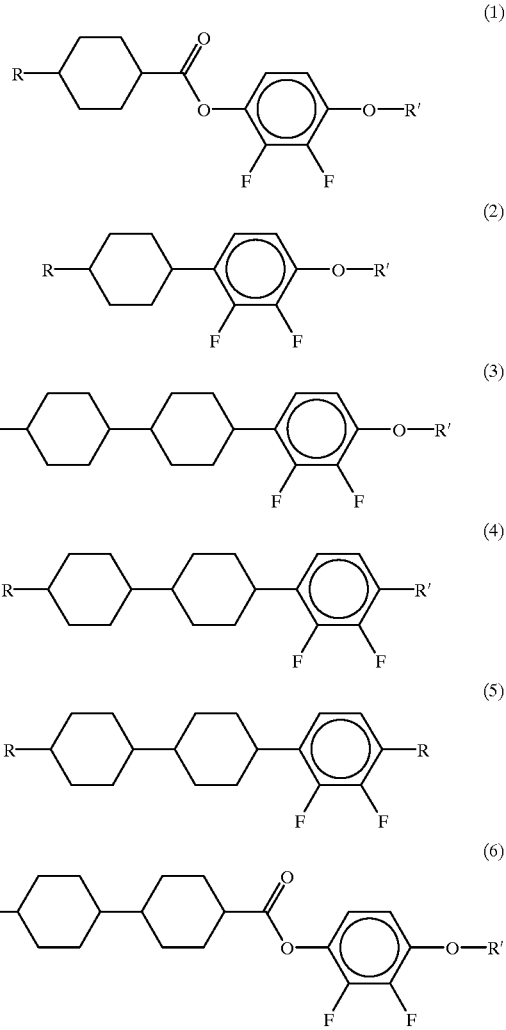

The end groups R and R' in formulas (1)–(6) may be any suitable functional groups typically found in liquid crystals known and commonly used in the art. As the liquid crystal material having a negative dielectric anisotropy, currently, a liquid crystal molecule having a cyano (CN - ) group on a side chain has been mainly used for an active-matrix type liquid crystal display using an amorphous silicon TFT having a low mobility as a switching element. However, the liquid crystal molecule having a cyano group on a side chain holds a residual d.c. voltage during low-voltage driving. Therefore, the liquid crystal molecule needs to be driven at a sufficiently high voltage and has a low voltage holding rate. In addition, sticking of a liquid crystal might be caused. In the present embodiment, however, a poly silicon TFT which is fabricated as a TFT in a low-temperature process and can be driven at a low voltage is used. Accordingly, in a case where the liquid crystal material having a cyano group on a side chain which has currently been utilized, it is impossible to make the most of the characteristics of the poly silicon TFT that low-voltage driving can be performed. In the present embodiment, a liquid crystal molecule having fluorine on a side chain as shown in the formulas (1) to (6) is blended as a liquid crystal material. The liquid crystal molecule having a fluorine side chain has a higher polarity of the side chain than the liquid crystal molecule having a cyano group on a side chain. The liquid crystal layer 40 having such a liquid crystal molecule blended can be reliably driven at a low voltage of about 2 V within a temperature range of −20° C. to 80° C. or more, for example. Furthermore, even if low-voltage driving is performed by the poly silicon TFT, a voltage is sufficiently held and sticking can be prevented. Moreover, the liquid crystal display can be driven at a low voltage. Therefore, it is possible to obtain a device having lower power consumption than the liquid crystal display using the amorphous silicon TFT.

In the present embodiment, the above-mentioned liquid crystal material having the negative dielectric anisotropy and containing a fluorine based liquid crystal molecule is used and the vertical alignment film 28 is utilized to perform DAP (deformation of vertically aligned phase) type alignment control in which the initial direction of the liquid crystal molecule is controlled in a vertical direction. The DAP type is a kind of electrically controlled birefringence (ECB) method in which a difference in a refractive index between a major axis of a liquid crystal molecule and a minor axis thereof, that is, a birefringence phenomenon, is utilized to control a transmittance of light incident on a liquid crystal layer.

In a case where the DAP type liquid crystal display is used for a projector or the like as will be described below, when a voltage is to be applied to the liquid crystal layer 40, linearly polarized light incident on the liquid crystal layer 40, through one of polarizing plates provided on the outside of the opposed substrate 30 and having polarizing directions orthogonal to each other, can be emitted as elliptically polarized light, and furthermore, as circularly polarized light from the other polarizing plate, using birefringence. When a voltage is not applied to the liquid crystal layer 40, liquid crystal molecules are vertically aligned by the vertical alignment film 28. Therefore, the light incident from one of the polarizing plates onto the liquid crystal layer 40 is neither subjected to birefringence nor emitted from the other polarizing plate. More specifically, in the DAP type liquid crystal display, a birefringence amount, that is, a phase difference (a retardation amount) between an ordinary ray component of the incident linearly polarized light and an extraordinary ray component thereof is determined according to an electric field strength in the liquid crystal layer 40 and display is changed from black to white, that is, display having a so-called normally black mode is obtained according to a rise in a voltage applied to the liquid crystal layer 40. By controlling the voltage applied to the liquid crystal layer 40 for each pixel, the amount of the light emitted from the other polarizing plate, that is, a transmittance, is controlled for each pixel so that desired image display can be obtained over the whole display.

In the present embodiment, furthermore, the alignment control window 34 is provided as an electrode absent portion on the common electrode 32 as shown in FIGS. 1 and 2. Consequently, the liquid crystal molecules are tilted in a predetermined azimuth on the basis of the alignment control window 34 to enhance the responsibility thereof. In addition, the alignment direction is divided in the pixel to relieve viewing angle dependency of the liquid crystal display. Thus, a display having a wide viewing angle can be implemented. When the voltage is applied to the liquid crystal layer 40, an oblique electric field is generated in different azimuths between an edge portion on each side of the pixel electrode 26 shown in FIG. 1 and the common electrode 32 as shown by a dotted line in FIG. 2. Therefore, the liquid crystal molecule is tilted in an opposite direction to the oblique electric field in a vertical alignment state in the edge portion on the side of the pixel electrode 26. When a tilt azimuth of the liquid crystal molecule is determined by the oblique electric field in the edge portion of the pixel electrode 26 (a tilt angle is determined depending on an electric field strength), an azimuth at which the liquid crystal molecules 42 in the vicinity of the center of the pixel electrode 26 conforms to an azimuth at which the liquid crystal molecules 42 on each side of the pixel electrode 26 because the liquid crystal molecules 42 have continuum properties. As a result, a plurality of regions having different tilt azimuths of the liquid crystal molecules are generated in one pixel region.

The alignment control window 34 is a portion where the common electrode 32 is not present. Therefore, only a voltage which is less than a liquid crystal operating threshold is always applied. For this reason, the liquid crystal molecules positioned on the alignment control window 34 are kept aligned vertically as shown in FIG. 2. The alignment control window 34 always acts as a boundary of regions having various tilt azimuths of the liquid crystal molecules. For example, if the alignment control window 34 is X-shaped as shown in FIG. 1, boundaries of regions A, B, C and D having various tilt azimuths are fixed onto the X-shaped alignment control window 34.

In the DAP type liquid crystal display described above, a transmittance is varied depending on the tilt of the liquid crystal molecule with respect to the incident light. Therefore, if the tilt azimuth of the liquid crystal molecule in one pixel region is one direction, a preferential viewing angle direction is also restricted to one corresponding direction so that viewing angle dependency is increased. Also in a case where regions having a plurality of different tilt azimuths are present in one pixel region, roughness is generated during display so that quality of the display is deteriorated if a boundary of the regions having the azimuths is changed for each selection period. However, the alignment control window 34 is provided so that alignment regions can be divided while the boundary of the regions to be tilted in a plurality of different azimuths is being fixed onto the alignment control window 34 and a plurality of preferential viewing angle directions can be provided (four angles: top, bottom, right and left in the present embodiment). Thus, the viewing angle of the liquid crystal display can be wide.

In the present embodiment, the flattened interlayer insulator film 24 is formed to cover the TFT and the electrode wiring, and the pixel electrode 26 is formed on the flattened interlayer insulator film 24. With such a structure, the greatest aperture ratio can be obtained without decreasing the aperture ratio by the TFT, the electrode wiring and the like. At the same time, electric fields generated by the TFT and the electrode wiring can be shielded by the pixel electrode 26. Consequently, the alignment of the liquid crystal layer 40 can be reliably prevented from being disturbed by the electric fields. Furthermore, the flatness of the surface of the pixel electrode 26 is enhanced by the flattened interlayer insulator film 24, thereby preventing the alignment of the liquid crystal molecules from being disturbed by the unevenness of the surface of the pixel electrode 26. Thus, the disturbance of the alignment of the liquid crystal molecules can be easily prevented. In the present embodiment, consequently, a rubbing step can be omitted. Since the rubbing step can be omitted, the poly silicon TFTs which are densely formed in a driver section by rubbing is not affected in a case where the poly silicon TFTs are used as switching elements of a display section and the same poly silicon TFTs formed on the periphery of the liquid crystal display section are also used as a driver. Accordingly, yield of the liquid crystal display can be enhanced.

[Relationship between Δn·d and a voltage—transmittance characteristic]

Next, the relationship between Δn·d and a voltage—transmittance characteristic of a liquid crystal display having a normally black mode in which a liquid crystal having a negative dielectric anisotropy is vertically aligned will be described below with reference to FIG. 3. In a case where the liquid crystal display is of a reflection type, a reflectance corresponds to a "transmittance". In a case where the liquid crystal display is of a transmission type, a transmittance corresponds to the "transmittance". In a transmission type liquid crystal display using ITO (Indium Tin Oxide) or the like as the pixel electrode 26 shown in FIG. 2, a voltage—transmittance characteristic is excellent with Δn·d of 0.35. More specifically, the transmittance (reflectance in FIG. 3) is increased from 0 (non-transmission) to about 0.47 in the vicinity of a voltage applied to the liquid crystal layer of 1 V to 2 V, and is kept almost as it is within a voltage of 2 V to 6 V.

On the other hand, in the reflection type liquid crystal display in which light is passed through the liquid crystal layer 40 twice by using the reflection pixel electrode 26, the voltage—transmittance characteristic is totally different from that of the transmission type liquid crystal display, that is, a sharp peak of the transmittance (reflectance) is generated in the vicinity of 1 V with Δn·d of 0.35. In the vicinity of a voltage of 3 V, the transmittance (reflectance) is set to 0 again. Even if a voltage of 3 V or more is applied, the transmittance (reflectance) is rarely raised. Accordingly, even if low-voltage driving at about 2v can physically be performed by employing a low-temperature poly silicon TFT, it is difficult to control the alignment of the liquid crystal layer with high precision in the reflection type liquid crystal display. Consequently, coloring of the display is caused. In a case where the reflection type liquid crystal display has Δn·d=0.43, a peak of the transmittance present in the vicinity of 1 V is further sharpened so that it becomes more difficult to perform control at a low voltage. The transmittance (reflectance) is temporarily set to 0 in the vicinity of 2 V, and is then raised again at 2 V or more.

Figure 3:
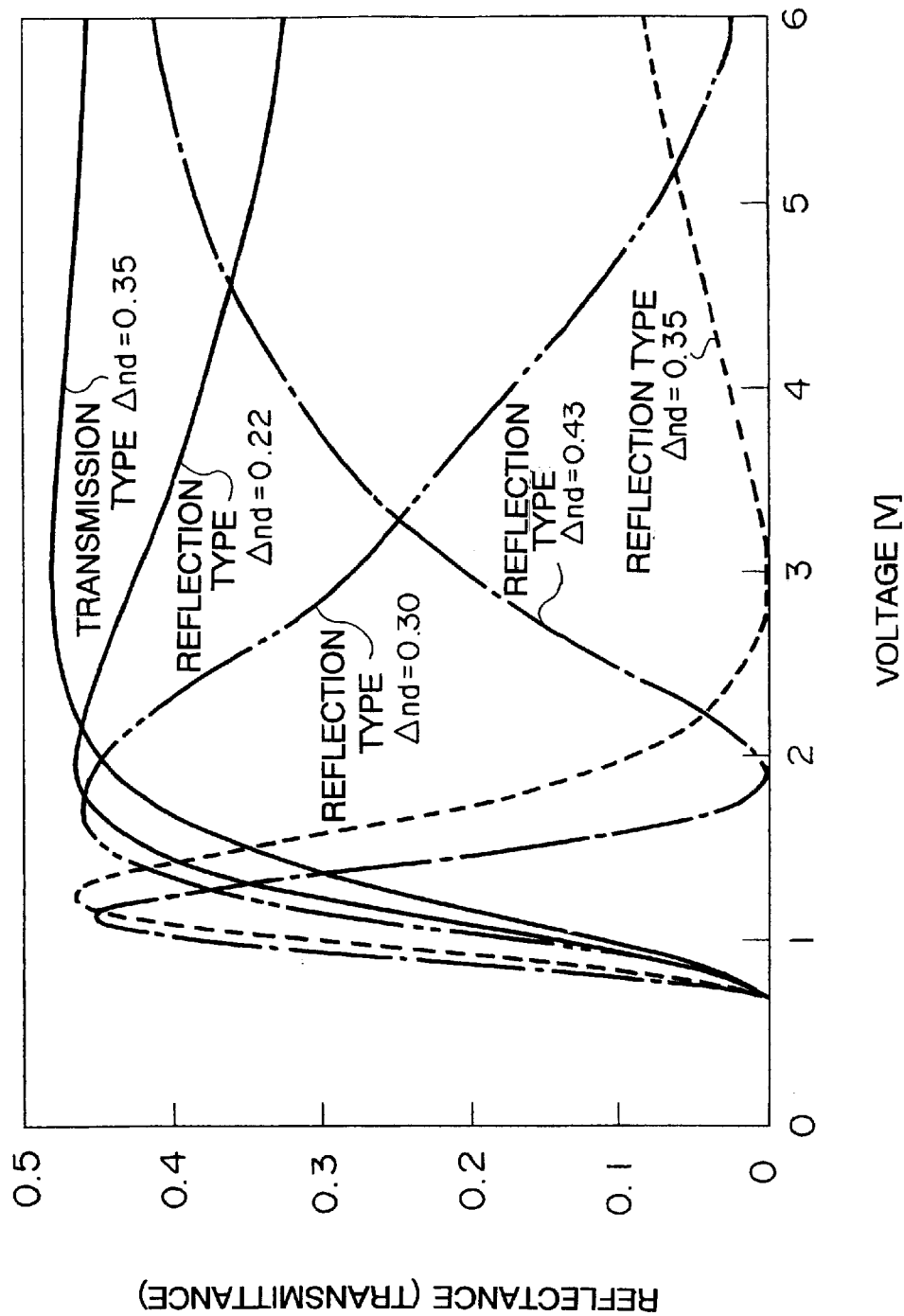
FIG. 3 is a chart showing a voltage—reflectance characteristic in the liquid crystal display having a normally black mode.

As shown in FIG. 3, however, the transmittance characteristic in a voltage region of 1 V to 2 V is moderate in the reflection type liquid crystal display with approximately Δn·d=0.30. The transmittance has a value greater than 0 at about 6 V. In the reflection type liquid crystal display with Δn·d=0.22, furthermore, the characteristic becomes more moderate between 1 V and 2 V. The transmittance raised to about 0.47 within these voltage ranges is reduced to about 0.35 with a voltage of 6 V. For use, stable control which is not inferior to that in the transmission type liquid crystal display having Δn·d=0.35 can be performed.

As described above, the reflection type liquid crystal display having a normally black mode using the poly silicon TFT can be reliably controlled at a low voltage by setting Δn·d smaller than about 0.30, more preferably, about 0.22.

In the present embodiment, the liquid crystal material containing liquid crystal molecules (Formulas (1) to (6)) having at least a fluorine side chain is used for the liquid crystal layer 40 as described above. The birefringence Δn can be set to about 0.07 or less. Accordingly, also in a case where a thickness d of the liquid crystal layer has a general value, for example, about 5 μm, the above-mentioned liquid crystal material is utilized to adjust a blending rate. Consequently, Δn·d can be set to 0.30 or less. If the thickness d of the liquid crystal layer is set to about 3 μm, a characteristic of Δn·d=0.22 shown in FIG. 3 can also be obtained easily.

In the present embodiment, furthermore, the flattened interlayer insulator film 24 is formed on the TFT and the electrode wiring and the pixel electrode 26 is formed on the flattened interlayer insulator film 24. By such a structure, a thickness of the flattened interlayer insulator film 24 is regulated without changing an efficiency of voltage application to the liquid crystal layer 40. Consequently, the thickness d of the liquid crystal layer 40 can be simply varied. Thus, Δn·d can be easily adjusted.

[Projector]

Figure 4:
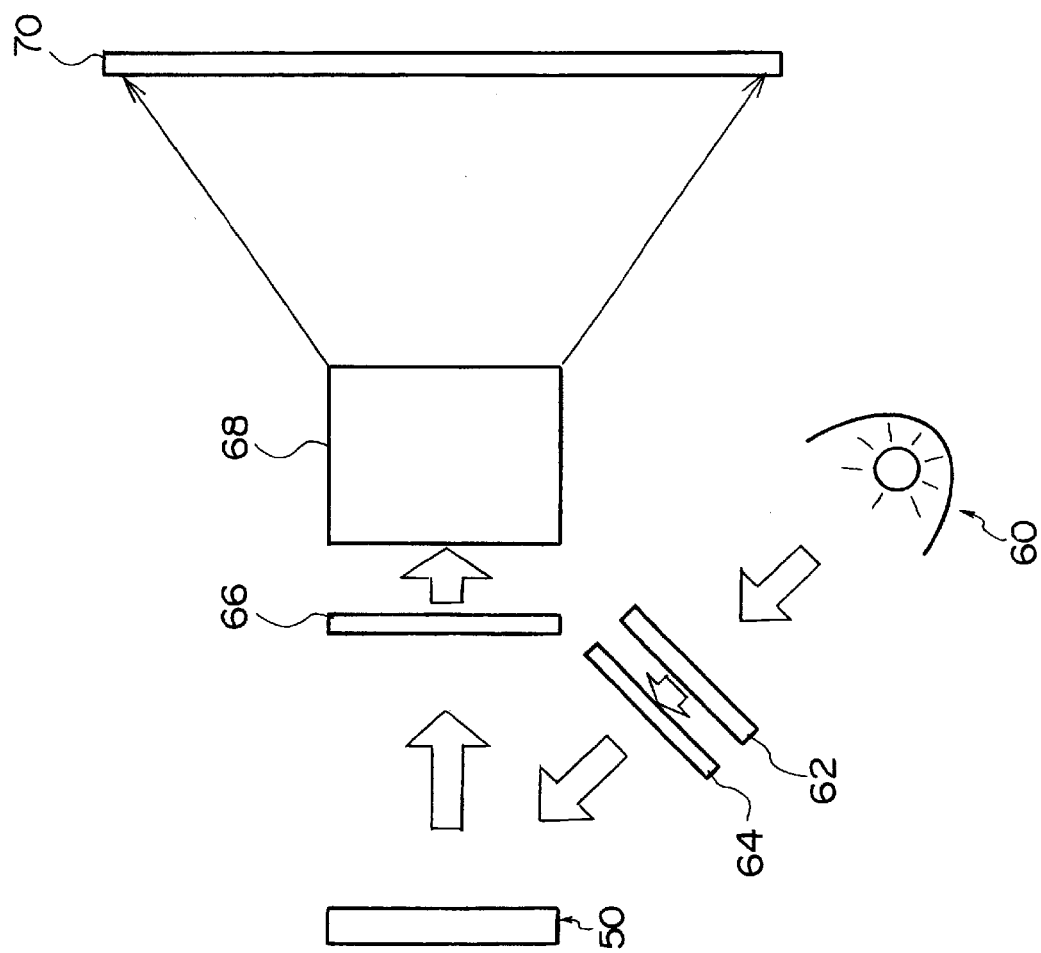
FIG. 4 is a view showing a schematic structure of a projector using the reflection type liquid crystal display according to the embodiment of the present invention.

FIG. 4 conceptually shows an example of a structure in which a reflection type liquid crystal display of a vertical alignment type using the above-mentioned poly silicon TFT is applied to a light valve of a projector. Light emitted from a light source 60 is incident on a polarizing separation filter 62. In the polarizing separation filter 62, polarized light is separated in a predetermined direction. The separated light is incident on a first polarizing plate 64. Only predetermined linearly polarized light passes through the first polarizing plate 64, and is incident on the above-mentioned reflection type liquid crystal display 50. The light emitted from the light source 60 can also be directly incident on the first polarizing plate 64. The polarizing separation filter 62 returns, into a direction of the light source 60, polarized light in the other direction which is not emitted to the first polarizing plate 64 but is separated. Therefore, the light can be reused as light of the source 60. Consequently, a light utilization factor can be increased.

The reflection type liquid crystal display 50 reflects the linearly polarized light passing through the first polarizing plate 64 in a reflection pixel electrode, and emits the reflected light. The light emitted from the reflection type liquid crystal display 50 is magnified and projected onto a screen 70 through a second polarizing plate 66 and a projector lens 68. Consequently, voltage application to the liquid crystal layer is controlled for each pixel of the reflection type liquid crystal display 50 so that an amount of the light emitted from the liquid crystal display 50 and passing through the second polarizing plate 66 can be controlled for each pixel and an optional image can be projected onto the screen 70.

In the present embodiment, particularly, a liquid crystal display having a wide viewing angle in which an alignment azimuth is divided in one pixel region by the alignment control window 34 as described above is utilized as the reflection type liquid crystal display 50. Accordingly, even if an angle of incidence on the liquid crystal display 50 is set in an oblique direction as shown in FIG. 4, fully reflected light can be obtained. Consequently, a bright image can be obtained on the screen 70. For this reason, degrees of freedom of a layout of the liquid crystal display 50 and other optical systems can be increased. Thus, the size of the whole projector can be reduced by appropriately designing the layout of each portion.

The liquid crystal display 50 has a structure in which the pixel electrode 26 covers the TFT. In the reflection type liquid crystal display, therefore, an aperture ratio can be set to have a very large value without restriction to the TFT and the electrode wiring differently from the transmission type liquid crystal display. Thus, a bright image can be projected by the screen 70. In the reflection type liquid crystal display, furthermore, the light source 60 can be provided near the projector lens 68 in respect of the layout. Consequently, the thickness of the whole projector can be reduced. Accordingly, in a front projection type liquid crystal display, that is, a system having the screen 70 formed as a large-sized separate member, the size of the projector itself can be comparatively reduced. Also in a system in which an image is projected from the rear face of the screen, that is, a so-called rear projection type, the size of the whole device can be reduced.

While there has been described what are at present considered to be a preferred embodiment of the invention, it will be understood that various modifications may be made thereto, and it is intended that the appended claims cover all such modifications as fall within the true spirit and scope of the invention.

What is claimed is:

1. A reflection type liquid crystal display comprising:
    a plurality of pixel electrodes provided in a matrix on a first substrate and made of a light reflecting material;
    a thin film transistor formed on the first substrate to be connected with the corresponding pixel electrodes and an electrode wiring thereof; and
    a liquid crystal layer held between the pixel electrodes provided on the first substrate and a common electrode on a second substrate opposed to the first substrate, the liquid crystal layer being driven for each pixel electrode to perform display operation,
    wherein a poly silicon thin film transistor utilizing a poly silicon layer for an active layer is used as the thin film transistor,
    an initial direction of each liquid crystal molecule of the liquid crystal layer held between the first and second substrates is controlled in a substantially vertical direction with respect to the pixel electrode, and
    a product $\Delta n \cdot d$ of a birefringence $\Delta n$ of the liquid crystal layer and a thickness d of the liquid crystal layer is set equal to or less than 0.30.

2. The reflection type liquid crystal display according to claim 1, wherein at least one kind of liquid crystal molecule with a molecular structure having fluorine on a side chain is selected as a liquid crystal material to be used for the liquid crystal layer.

3. The reflection type liquid crystal display according to claim 1, wherein an electrode-free portion for controlling the alignment of the liquid crystal is provided as an alignment control window in a corresponding region of the common electrode provided on the second substrate which is opposed to the pixel electrode, and a plurality of alignment regions having different tilt azimuths are formed in each pixel electrode region while changing the vertical alignment of the liquid crystal molecule.

4. The reflection type liquid crystal display according to claim 1, wherein the first substrate has a flattened interlayer insulator film formed thereon to cover the thin film transistor and the electrode wiring thereof which are provided on the first substrate, and
    the pixel electrodes formed on the flattened interlayer insulator film to cover a region where at least the thin film transistor is formed.

5. The reflection type liquid crystal display according to claim 1, wherein the thin film transistor uses, as an active layer, a poly silicon layer formed at a low temperature.

6. The reflection type liquid crystal display according to claim 3, wherein a liquid crystal material to be used for the liquid crystal layer has a negative dielectric anisotropy, and
    the vertical alignment of the liquid crystal layer is controlled without a rubbing step by vertical alignment films formed to cover the common electrode and the pixel electrodes, the alignment control window provided on the common electrode and a voltage applied to each of the pixel electrodes.

7. The reflection type liquid crystal display according to claim 2, wherein the first substrate has a flattened interlayer insulator film formed thereon to cover the thin film transistor and the electrode wiring thereof which are provided on the first substrate, and
    the pixel electrodes are formed on the flattened interlayer insulator film to cover a region where at least the thin film transistor is formed.

8. The reflection type liquid crystal display according to claim 2, wherein at least one of formulas (1) to (6) is selected as the liquid crystal molecule:

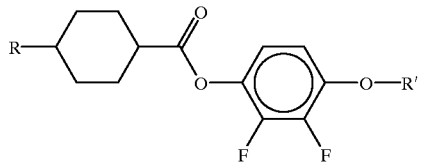

(1)

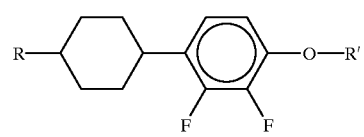

(2)

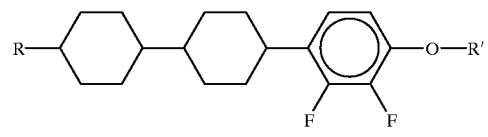

(3)

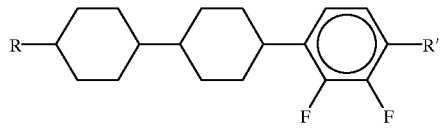

(4)

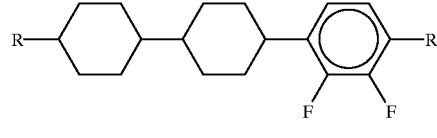

(5)

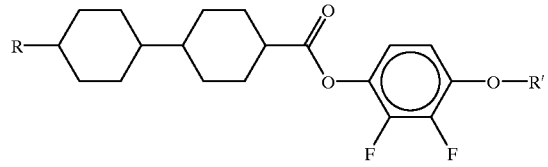

(6)

wherein R and R' are suitable functional groups.

* * * * *